United States Patent
Sugiyama

(10) Patent No.: US 7,061,837 B2
(45) Date of Patent: Jun. 13, 2006

(54) DIGITAL-AUDIO-SIGNAL RECORDING APPARATUS

(75) Inventor: Tadashi Sugiyama, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 781 days.

(21) Appl. No.: 10/034,166

(22) Filed: Dec. 28, 2001

(65) Prior Publication Data

US 2002/0085461 A1 Jul. 4, 2002

(30) Foreign Application Priority Data

Dec. 28, 2000 (JP) .................................. 2000-401811

(51) Int. Cl.
G11B 7/00 (2006.01)

(52) U.S. Cl. .................... 369/47.12; 369/84; 369/53.21

(58) Field of Classification Search ................ 369/47.1, 369/47.12, 47.13, 47.15, 47.21, 53.1, 53.12, 369/53.16, 53.2, 53.21, 53.37, 53.45, 59.1, 369/59.23, 83, 84, 85
See application file for complete search history.

(56) References Cited

U.S. PATENT DOCUMENTS

| | | | |
|---|---|---|---|
| 5,343,451 A | 8/1994 | Iizuka | 369/30.19 |
| 5,373,493 A | 12/1994 | Iizuka | 369/124.14 |
| 5,563,866 A | 10/1996 | Taguchi et al. | 369/83 |
| 5,625,570 A | 4/1997 | Vizireanu et al. | 700/94 |
| 5,633,726 A | 5/1997 | Timmermans | 386/70 |
| 5,633,839 A | 5/1997 | Alexander et al. | 700/234 |
| 5,787,224 A | 7/1998 | Itoh et al. | 386/52 |
| 5,940,351 A | 8/1999 | Fujinami et al. | 369/30.04 |
| 5,987,607 A * | 11/1999 | Tsumura | 713/200 |
| 6,172,948 B1 | 1/2001 | Keller et al. | 369/83 |
| 6,243,725 B1 | 6/2001 | Hempleman et al. | 715/530 |
| 6,542,445 B1 | 4/2003 | Ijichi et al. | |
| 6,587,403 B1 | 7/2003 | Keller et al. | 369/30.06 |
| 6,587,404 B1 | 7/2003 | Keller et al. | 369/30.6 |
| 6,621,768 B1 | 9/2003 | Keller et al. | 369/30.5 |
| 2002/0188461 A1 | 12/2002 | Matsumoto | |

FOREIGN PATENT DOCUMENTS

| | | |
|---|---|---|
| EP | 0675488 | 10/1995 |
| JP | 05-020850 | 1/1993 |
| JP | 07-334317 | 12/1995 |
| JP | 2000-200475 | 7/2000 |
| JP | 2000-0251486 | 9/2000 |

OTHER PUBLICATIONS

Japanese Patent Office, Official Action, issued Jun. 7, 2005.

* cited by examiner

Primary Examiner—Muhammad Edun
(74) Attorney, Agent, or Firm—Pillsbury Winthrop Shaw Pittman LLP

(57) ABSTRACT

Audio data are read out, via an ATAPI interface, from an audio CD set in a CD drive. Thus, even where an inexpensive low-speed CPU is used, high-speed copying can be performed. When audio data stored on a hard disk are to be reproduced, and if copying authorization/inhibiting information indicates that coping of the audio data should be inhibited, the audio data are output, via a digital audio interface, with a copying-inhibiting subcode imparted to the data. Further, when the audio data stored on the hard disk are written to a CDR media set in the CD drive, the audio data on the hard disk are erased in correspondence with the writing of the digital audio data to the CDR media. With such a copying restricting feature, it is possible to provide a digital-audio-signal recording apparatus that can be properly used as consumer equipment.

6 Claims, 10 Drawing Sheets

DIGITAL-AUDIO-SIGNAL RECORDING APPARATUS

BACKGROUND OF THE INVENTION

The present invention relates to digital-audio-signal recording apparatus for recording or copying audio data of a CD onto a hard disk.

There are known apparatus which copy audio data of a CD to a hard disk and then write the thus-copied audio data from the hard disk to a CD-R disk to create a fresh CD containing the audio data. Some of the apparatus are in actual commercial use today as dedicated equipment, and functions similar to those of such apparatus can also be implemented using a combination of a personal computer and software.

However, it has not been easy for ordinary audiophiles to use personal computers for such purposes because the personal computers require troublesome manipulations. The commercial-use dedicated equipment, on the other hand, are relatively easy to manipulate, but could not be properly used as consumer equipment because they undesirably enable digital copying of audio data in a chain-like or concatenated fashion.

SUMMARY OF THE INVENTION

In view of the foregoing, it is an object of the present invention to provide an improved digital-audio-signal recording apparatus which can be properly used as consumer equipment.

In order to accomplish the above-mentioned, the present invention provides a digital-audio-signal recording apparatus which comprises: a disk drive that reads out data stored on a disk-shaped storage medium; a hard disk drive that stores digital audio data, read out from the disk-shaped storage medium, on a hard disk installed therein; an interface control section that writes, on the hard disk, the digital audio data read out from the disk-shaped storage medium only when copying authorization/inhibition information, also read out from the disk-shaped storage medium, indicates that copying of the digital audio data is permitted or authorized.

The digital-audio-signal recording apparatus of the present invention examines the copying authorization/inhibition information of the digital audio data read out from the disk-shaped storage medium, and if the copying authorization/inhibition information indicates that copying of the digital audio data is not authorized, i.e. should be inhibited, the recording apparatus does not write the digital audio data on the internal hard disk. Such arrangements can effectively inhibit a chain (concatenation) of digital copying (chain-like digital copying), and thus allow a recording apparatus, such a hard disk recorder, to be properly used as consumer equipment.

The digital-audio-signal recording apparatus of the present invention may include a bus interface so that an operation for writing, on the hard disk, the digital audio data read out from the disk-shaped storage medium and an operation for extracting the copying authorization/inhibition information can be performed via the bus interface. In the digital-audio-signal recording apparatus of the present invention, the hard disk drive may store audio data of tracks corresponding to a plurality of the disk-shaped storage media, so that the interface control section reproductively outputs the digital audio data of the tracks from the hard disk. The digital-audio-signal recording apparatus may further comprise a music-piece-selection control section that selects a desired track from among the tracks corresponding to the plurality of the disk-shaped storage media and designates the selected desired track as a track to be reproduced via the interface control section. Further, in the digital-audio-signal recording apparatus of the invention, the music-piece-selection control section may include a section that stores, as an album, a listing of tracks selected from among the tracks corresponding to the plurality of the disk-shaped storage media.

According to another aspect of the present invention, there is provided a digital-audio-signal recording apparatus which comprises: a hard disk drive that has a hard disk storing digital audio data; a write section that writes digital audio data on a disk-shaped storage medium; an interface control section that causes the write section to write the digital audio data, stored on the hard disk, to the disk-shaped storage medium and also erases the digital audio data from the hard disk in correspondence with the audio data writing to the disk-shaped storage medium.

When the digital audio data stored on the hard disk have been written to the disk-shaped storage medium, which is another storage means in the digital-audio-signal recording apparatus, the recording apparatus erases the digital audio data from the hard disk in correspondence with the audio data writing to the disk shaped storage medium. Thus, even where the digital audio data on the hard disk are a copy of audio data from another source, the audio data writing to the disk-shaped storage medium never constitutes chain-like digital copying but just a so-called "transfer of data" from the hard disk to the disk-shaped storage medium. Accordingly, the inventive arrangements allow a recording apparatus, such a hard disk recorder, to be properly used as consumer equipment.

According to still another aspect of the present invention, there is provided a digital-audio-signal recording apparatus which comprises: a hard disk drive that has a hard disk storing digital audio data and subcode information; a write section that writes data on a disk-shaped storage medium; an interface control section that reads out the digital audio data and subcode information from the hard disk and edits the read-out digital audio data and subcode information into a CD-DA format, so as to supply the edited digital audio data and subcode information to the write section. In this digital-audio-signal recording apparatus, the digital audio data and subcode information, stored as subcodes on an audio CD, are separately stored in advance on the hard disk, and when the digital audio data and subcode information are to be written to the disk-shaped storage medium, the digital audio data and subcode information are first edited into the CD-DA format and then supplied to the disk-shaped storage medium. Such arrangements permit copying or creation of a music CD containing textual information and the like.

With the above-mentioned arrangement that the operation for writing, on the hard disk, the digital audio data read out from the disk-shaped storage medium and the operation for extracting the copying authorization/inhibition information are performed via the bus interface without intervention of a CPU, the present invention can significantly lessen the loads on the CPU, so that even where an inexpensive low-speed CPU is used, the present invention permits efficient high-speed copying. As a consequence, the present invention can provide inexpensive consumer-oriented recording equipment. Further, with the hard disk capable of storing tracks (music pieces) corresponding to a plurality of audio CDs, the present invention allows any desired ones of the tracks to be freely combined and reproduced. As a result, the digital-audio-signal recording apparatus of the present invention can operate as an extremely-high-speed CD changer which requires little time for CD replacement.

It should be appreciated that the disk-shaped storage medium used in the present invention may be any one of various storage disks, such as a CD, DVD and MD.

BRIEF DESCRIPTION OF THE DRAWINGS

For better understanding of the object and other features of the present invention, its preferred embodiments will be described hereinbelow in greater detail with reference to the accompanying drawings, in which.

DETAILED DESCRIPTION OF THE PREFERRED EMBODIMENTS

The following will describe a digital-audio-signal recording apparatus in accordance with an embodiment of the present invention, but it should be appreciated that the present invention is not limited to the described embodiment and various modifications of the invention are possible without departing from the basic principles. The scope of the present invention is therefore to be determined solely by the appended claims.

Figure 1:
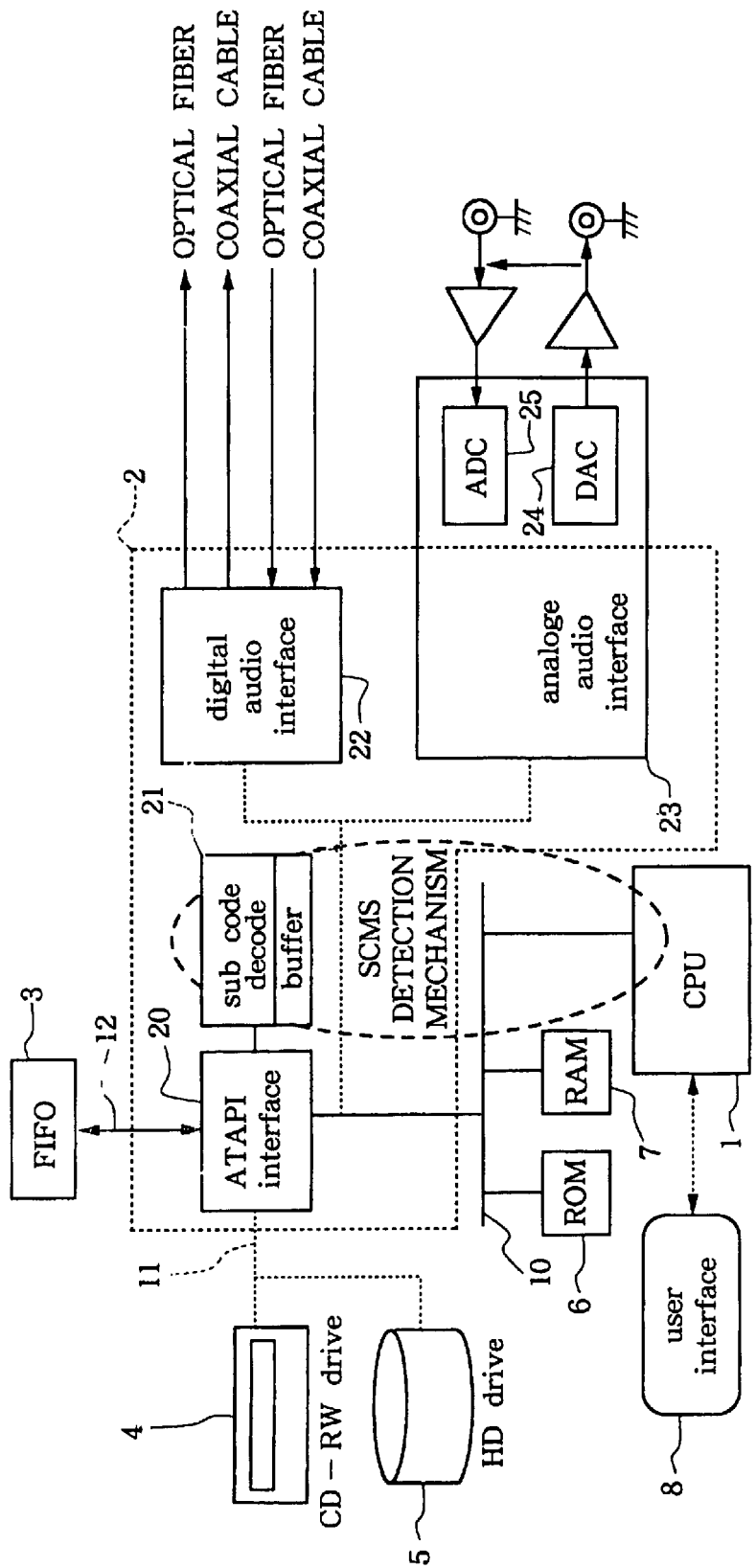
FIG. 1 is a block diagram showing an exemplary general setup of a digital-audio-signal recording apparatus in accordance with an embodiment of the present invention.

FIG. 1 is a block diagram showing an exemplary general setup of the digital-audio-signal recording apparatus of the present invention, in which a controller 2 includes an ATAPI (acronym for At bus Attachment Packet Interface) interface 20, a subcode detection section 21, a digital audio interface 22, and an analog audio interface 23. To the controller 2 (ATAPI interface 20) are connected, via an ATAPI bus 11, a CD drive 4 and a hard disk drive (hereinafter simply referred to as a "hard disk") 5. Further, a FIFO memory 3 and a CPU 1 are connected to the controller 2 (ATAPI interface 20) via a memory bus 12 and a CPU bus 10, respectively. ROM 6 and a RAM 7, in addition to the controller 2, are connected to the CPU bus 10, and a user interface 8 is connected to the CPU 1.

The digital audio interface 22 of the controller 2 has input terminals for optical fibers and coaxial cable and output terminals for optical fibers and coaxial cable. The analog audio interface 23 has an A/D converter (ADC) 25 for converting each input analog signal into digital representation, and a D/A converter (DAC) 24 for converting each digital data to be output into analog representation. The subcode detection section 21 separates or extracts subcode information from data of the CD-DA (Compact Disk-Digital Audio) standard read out from a CD (hereinafter referred to as an "audio CD") that is a disk-shaped storage medium, and decodes the thus-extracted subcode information so as to read a track number, copying authorization/inhibition information, etc. The subcode detection section 21 includes a buffer for temporarily storing the subcode information and transfers the subcode information from the buffer to the hard disk 5 and CPU 1.

The CPU 1, which controls all operations in the recording apparatus, gives the controller 2 instructions as to which predetermined data are to be read from and which predetermined data are to be output to. Also, the CPU 1 manages files stored on the hard disk 5. The file management is performed by the CPU 1 on the basis of a file management information table (see FIG. 5) stored on the same hard disk 5.

Figure 2:
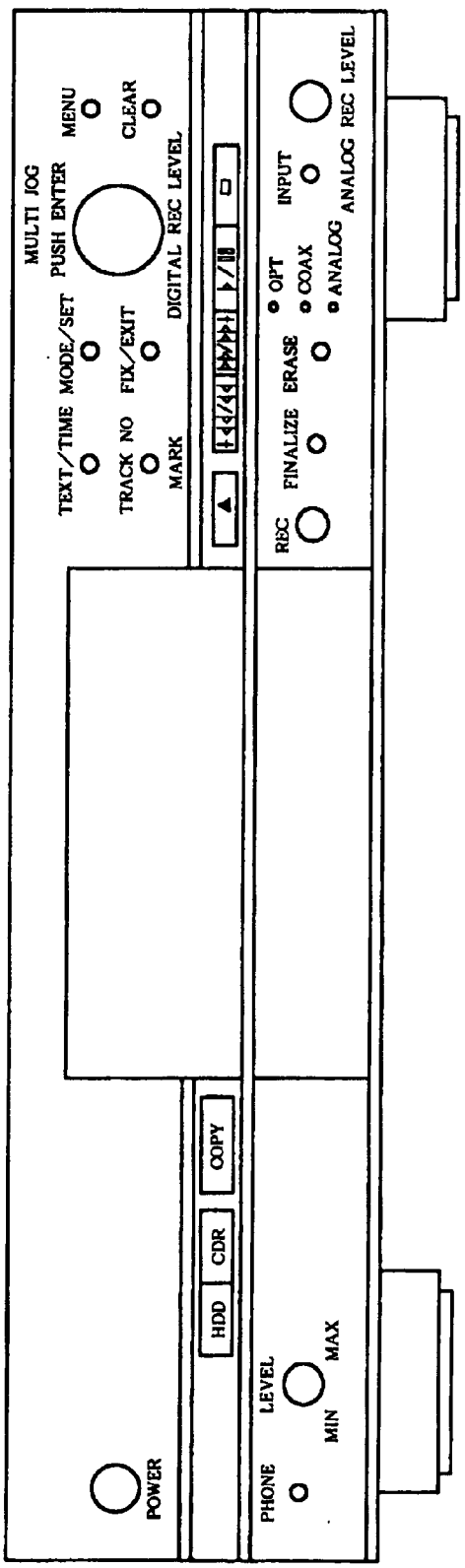
FIG. 2 is a front view of an operation panel of the digital-audio-signal recording apparatus shown in FIG. 1.

The user interface 8 includes a group of operators (operating members) and a display section provided on an operation panel shown in FIG. 2. The group of operators includes switches, such as a play button and stop button similar to those of a conventional CD player, a multi-functional jog dial operable for selecting a desired disk and track, and so on. The display section visually displays a selected or currently-reproduced track number and the like. In the embodiment described here, the tracks and music pieces correspond to each other in a one-to-one relation and thus the terms "track" and "music piece" are used interchangeably.

The CD drive 4 is a so-called "CD-RW" drive that can not only read audio data from an audio CD set therein but also write desired audio data onto a write-once CD-R disk or rewritable CD-RW disk. Hereinafter, such CD-R and CD-RW disks will be generically called CDR disks for convenience of description. The hard disk 5 used here has a storage capacity of about 20 GB and is capable of cumulatively storing data of 30–40 audio CDs; however, the storage capacity of the hard disk 5 is not necessarily so limited.

Figure 3:
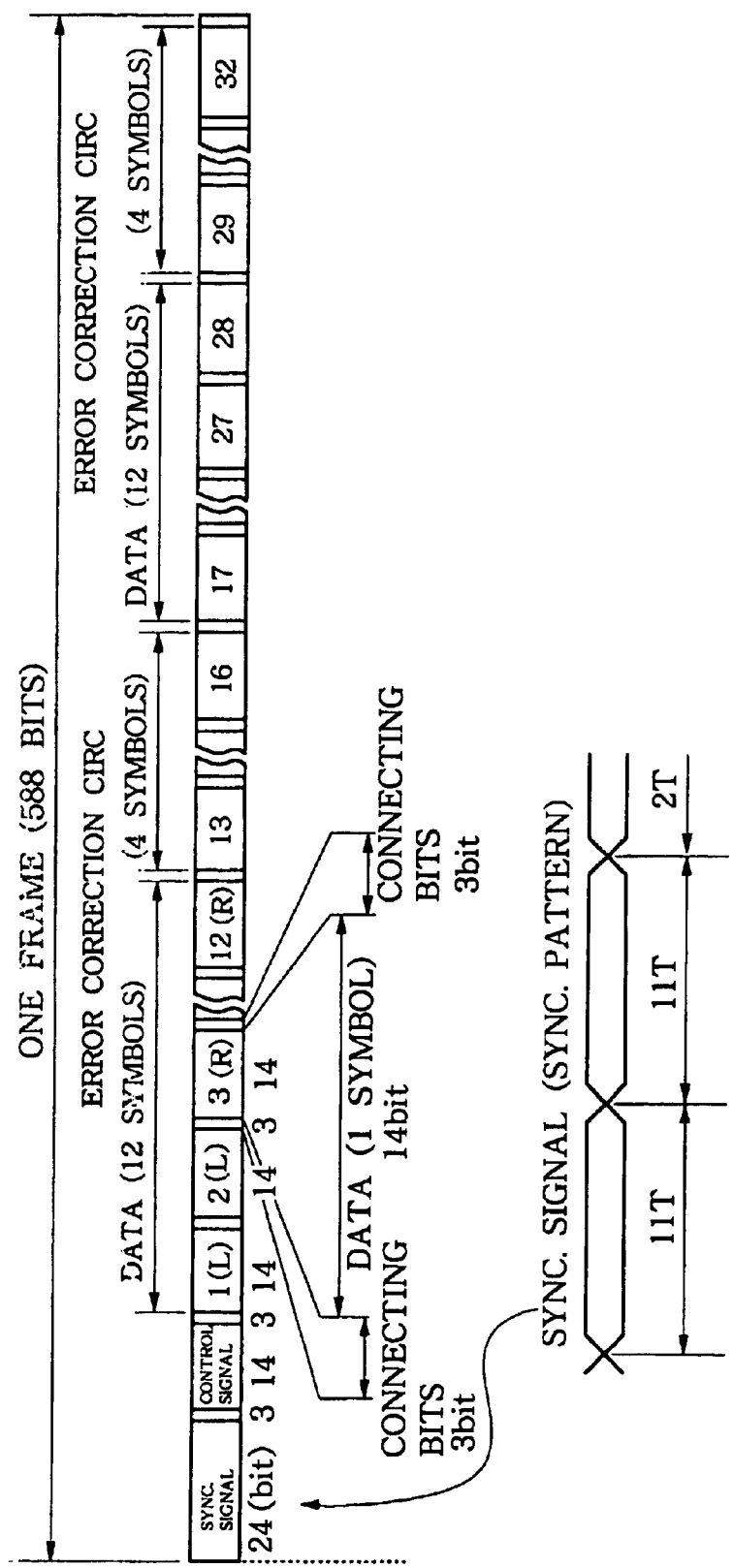
FIG. 3 is a diagram showing general construction of a frame based on the CD-DA standard.

Now, with reference to FIG. 3, a description will be made about the CD-DA (Compact Disk-Digital Audio) standard that concerns a storage format of the audio CD. According to the CD-DA standard, audio signals are converted into digital data by a two-channel 16-bit quantization scheme at a sampling frequency of 44.1 kHz, and the resulting sample data are formed into frames with every six samples imparted with CIRC (Cross-Interleaved Reed-Solomon Code) parity. Namely, 32 symbols with CIRC parity added thereto form one frame, which correspond to six samples. Therefore, the repetition cycle of the frame is 7.35 kHz (sampling frequency 44.1 kHz÷6=7.35 kHz). Each frame is also imparted with a 24-bit synchronization signal, 1-byte subcode information, etc. Thus, each frame is composed of 588 bits in total. The audio data recorded on an audio CD are the results of such frame data having been CIRC-encoded and then EFM-modulated.

The above-mentioned subcode information is additional information intended for efficient music reproduction from the audio CD, and it includes not only data indicative of a unique number, index, playing time etc. of the music piece in question but also textual, graphical data, etc. Data of one byte can be included in each frame (7.35 kHz); however, because a variety of pieces of information are inserted as noted above, a subcode frame is formed across 98 frames so that one independent unit of subcode information is composed of by 98 bytes. These 98 frames are called a "sector". Therefore, the repetition cycle of the sector (subcode frame) is 7.35 kHz/98 (=75 Hz). Individual bits added as the one-byte subcode information to the individual frames amount to 98 bits in each sector, and are called a P channel, Q channel, R channel, S channel, T channel, U channel, V channel and W channel. Information of different contents is written in each of these channels. In the Q channel, there are written the total number of the tracks (i.e., music pieces), track numbers (music piece numbers), time information, copyright control signal, etc.

The operations for reading out and demodulating data from the audio CD, having the data stored in the above-described format, are performed by the CD drive 4, which transmits the demodulated data to the controller 2 via the ATAPI bus. The controller 2 extracts the subcode signal of every frame from the data read out from the CD drive 4 and transmitted via the ATAPI bus and creates subcode information from the thus-extracted subcode signals. When data are to be copied or transferred from the hard disk 5 to the CD drive 4, the controller 2 also performs an operation for outputting the stored audio data and subcode information to the CD drive 4. For example, the controller 2 comprises a dedicated LSI.

More specifically, the controller 2 reads out data from an audio CD set in the CD drive 4, writes data onto a CDR set in the the controller 2 carries out an extraction mode process, reproduction mode process and write mode process, as will be extracting the audio data from the audio CD set in the CD drive 4 and storing the extracted audio data on the hard disk 5. The reproduction mode process is a process for reading out audio data stored on the audio CD set in the CD drive 4 or on the hard disk 5 and then outputting the thus read-out audio data via the digital interface 22 or analog audio interface 23. Further, the write mode process is a process for writing or copying audio data, stored on the hard disk 5, to the CDR disk set in the CD drive 4 and also erasing the original data on the hard disk 5 in correspondence with the data writing to the CDR disk.

In each of the extraction mode process, reproduction mode process and write mode process, the FIFO memory 3 is used as a buffer for allowing the data processing to be performed smoothly in the recording apparatus. The FIFO memory may comprise either a dedicated FIFO memory device or a conventional RAM. In the latter case, a FIFO area is allocated in the RAM, and write and readout addresses may be additively stored in the leading address of the FIFO area.

The digital-audio-signal recording apparatus of the present invention is designed for consumer use, and thus has a copying restricting function based on the principles of the SCMS (Serial Copy Management System) that inhibits unlimited copying of digital audio data. The SCMS operates as follows in each of the extraction mode process, reproduction mode process and write mode process.

In the extraction mode, the process is performed for digitally copying audio data, read out from the audio CD, onto the hard disk 5. When a copying inhibiting code is written in the subcode information having been decoded after extraction from the readout audio data (frame data), copying of the audio data (track) is inhibited in the extraction mode. According to the SCMS, a copying inhibiting code is written into the subcode information of the audio data digitally copied from the original CD, so as to prevent re-copying (second-generation copying) of the audio data. Even when the subcode information of the read-out audio data indicates "copying permitted", not only the audio data are written to the hard disk 5 but also a copying inhibiting code is written into file management information of the audio data. This is because a re-copy (second-generation copy) of the audio data would be produced if the copying of the audio data is permitted. Therefore, the audio data stored on the hard disk 5 are allowed to be written (copied or moved) to another storage medium, such as a CDR disk, only on condition that the audio data are erased from the hard disk 5 in correspondence with the audio data writing to the other storage medium.

In the reproduction mode, the process is performed for reading out audio data stored on the audio CD or hard disk 5 (i.e., audio data copied from the original audio CD) and then outputting the thus read-out audio data via the audio interface. When a copying inhibiting code is written in the subcode information having been decoded after extraction from the read-out audio data, the SCMS outputs the audio data via the analog audio interface 23, and also outputs, via the digital audio interface 22, the audio data with a copying inhibiting subcode imparted thereto, so as to inhibit any external equipment from digital storage of the audio data. In the event that the subcode information of the read-out audio data indicates "copying permitted", the SCMS outputs the audio data via the analog audio interface 23, and also outputs the audio data, via the digital audio interface 22, with a copying permitting subcode imparted thereto.

In the write mode, the process is performed for writing audio data stored on the hard disk 5 to the CDR disk set in the CD drive 4. When the file management information of the audio data to be written indicates "copying inhibited", the SCMS writes the data onto the CDR disk and also erases the audio data from the hard disk 5 in correspondence with the audio data writing to the CDR disk, in a manner described later. Further, when audio data input from the audio CD set in the CD drive 4 or input via the digital audio interface 22 have been stored, the file management information of such audio data is set to indicate "copying inhibited". Furthermore, when audio data input via the analog audio interface 23 have been stored, the file management information of such audio data is set to indicate that only first-generation copying is permitted. Namely, whereas production of a first-generation copy from the original is permitted, production of a second-generation copy, which a re-copy from the first-generation copy, is not permitted. The foregoing are operations based on the SCMS standard.

When audio data are read out from the audio CD, the subcode detection section 21 extracts the subcodes from the read-out data, decodes each extracted subcode, and passes the decoded subcode to the CPU 1. The CPU 1 sends, back to the controller 2, a signal authorizing/inhibiting the data write and output operations, on the basis of copying authorization/inhibition information included in the subcode. Further, at the time of the audio data reproduction (output), the CPU 1 displays, on the display section, the track number and time information included in the subcode information.

Figures 4A, 4B:
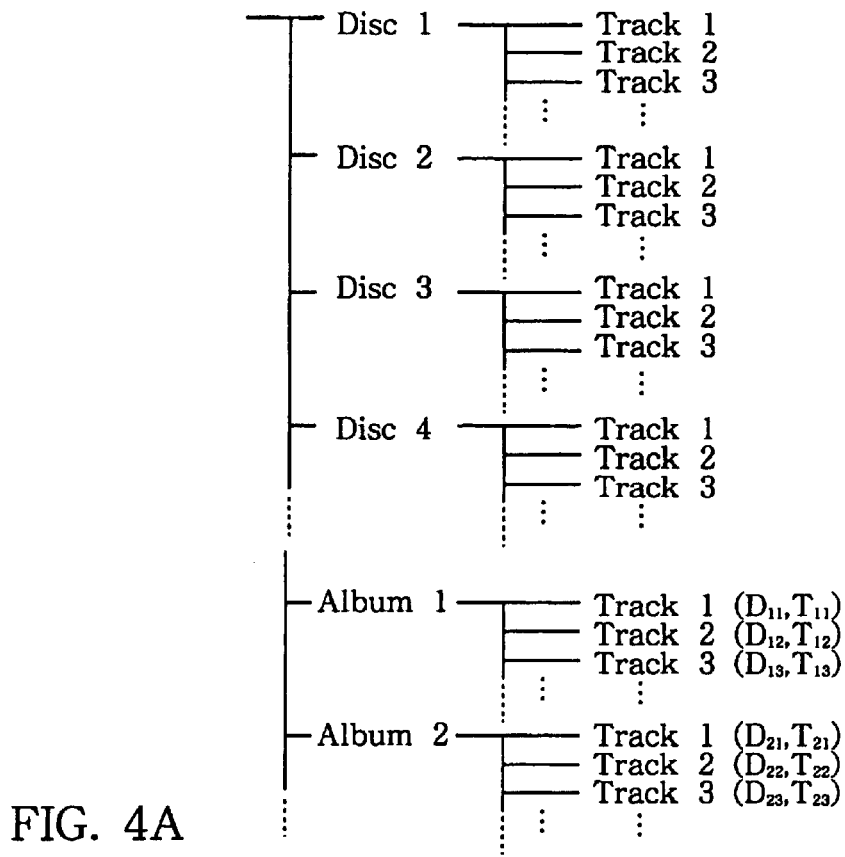
FIG. 4A is a diagram explanatory of a file management scheme employed in the digital-audio-signal recording apparatus.
FIG. 4B is a diagram showing a file management information table for managing individual audio data files (tracks) stored under a disk directory.

FIG. 4A is a diagram explanatory of a file management scheme employed in the digital-audio-signal recording apparatus of the present invention. When audio data are to be copied from the audio CD in the extraction mode, a disk directory is created for the audio CD in question; namely, one disk directory is created for each audio CD (Disc 1, 2, 3, . . . ). Then, audio data files (Track 1, 2, 3, . . . ) extracted from the audio CD are created under the disk directory. Desired track (music piece) can be designated (selected) by the user designating a combination of the disk number and track number.

The user can also create an album for reproducing (or writing, onto a CDR,) a freely selected combination of the audio data files stored under the disk directory. Although FIG. 4A shows each album as having a directory structure similarly to the disks, the album is, in practice, a listing of data specifying a plurality of the audio files (tracks) stored under the disk directory.

When a desired disk or album is designated in the normal reproduction mode, the reproduction mode process sequentially reproduces the tracks contained in the disk or album (i.e., the tracks stored under the disk directory or specified by the listing of the album), after which the process is brought to en end. Only one music piece can be reproduced, or a plurality of disks or albums can be successively reproduced in this reproduction mode, as desired by the user.

FIG. 4B is a diagram showing a file management information table for managing the individual audio data files (tracks) stored under the disk directory. In the figure, there is shown only a record corresponding to one audio data file. The file management information table stores, for each of the audio data files, information identifying the file (such as the disk number Dm and track number Tn of the file), file validity information, erasure state flag, copying authorization/inhibition information, and subcode information. The file validity information is information that determines presence/absence of the file (Dm and Tn); namely, if the file validity information indicates "non-valid", the file in question is disconnected to assume an erased state so that readout of the file is disabled. In other words, the file validity information is information of a control program level like FAT (File Allocation Table) information of a DOS (Disk Operating System). The erasure state flag is a flag used, in an audio data transfer (move) from the hard disk 5 to the CDR disk, in such a manner that only data readout for a currently-performed data transfer is allowed and the file is treated as "erased" in response to any other accesses. The copying authorization/inhibition information is a code indicating whether or not the digital copying of the audio data is permitted. The subcode information is generally the same as the one contained in the audio CD and includes data indicative of the tile and the like of the music piece in question.

Figure 5:
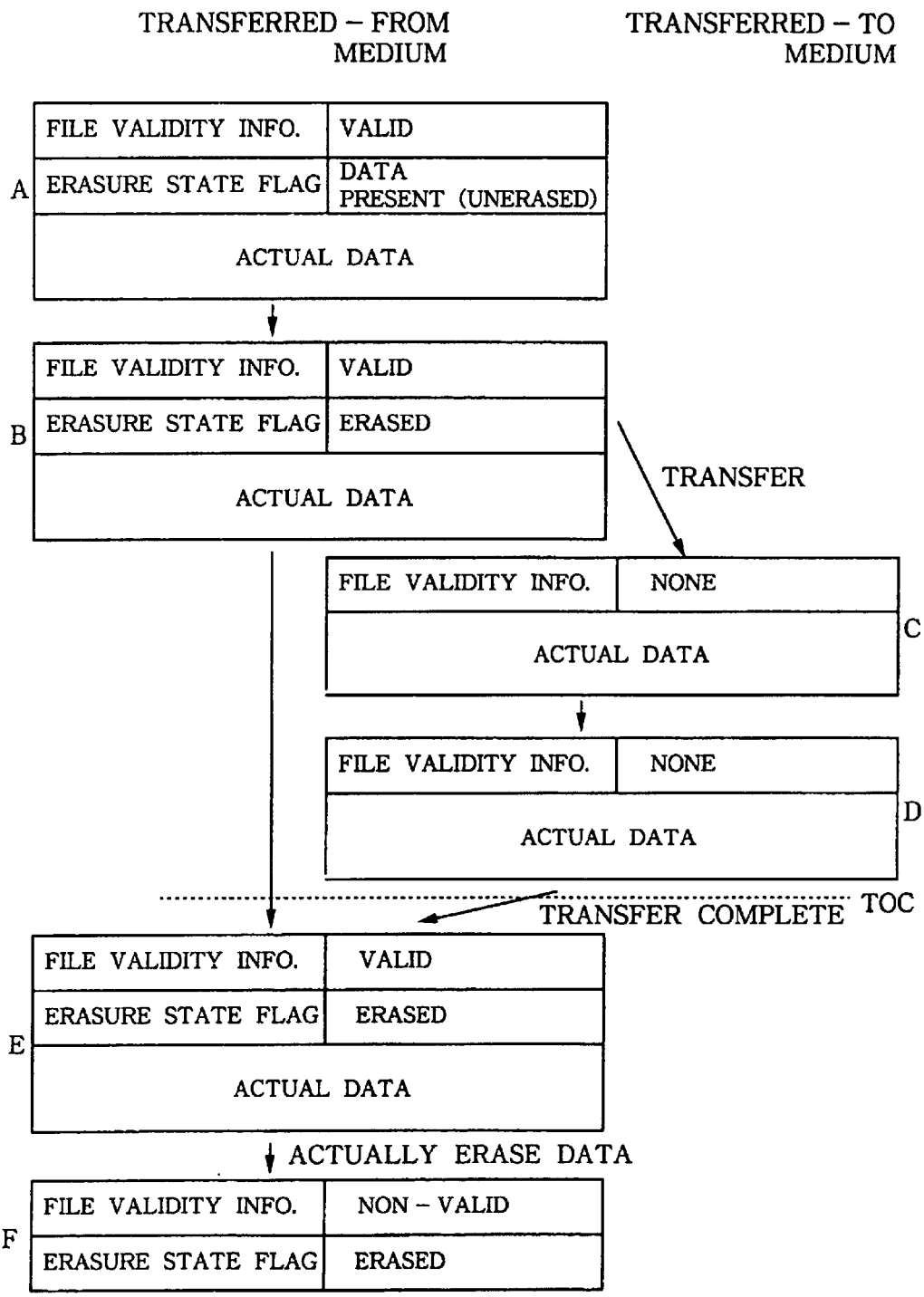
FIG. 5 is a diagram explanatory of details of the file management information table and a manner in which the table is rewritten.

FIG. 5 is a diagram explanatory of a series of steps for managing the file management information when an audio data file (track) inhibited from being copied is to be transferred from a transferred-from storage medium (source) to a transferred-to storage medium (destination). Before initiation of the transfer process, the file validity information indicates "valid" and the erasure state flag is in reset condition indicating that there are data in the transferred-from storage medium. Once the transfer process is started, the erasure state flag is set to indicate an erased state, so that the actual data portion (audio data) and subcode information are transferred and written to the predetermined destination (e.g., CDR disk). Then, when the writing of the audio data and subcode information has been completed properly, the file management information (file validity information) of the predetermined destination is set to indicate "valid".

After that, the file validity information is set to indicate "non-valid", and the audio data file is erased from the hard disk 5.

By keeping the erasure state flag in the rest condition prior to the transfer process and then setting the file validity information to indicate "non-valid" after the transfer process as noted above, it is possible to disable any access to the actual data portion, other than the access for the data transfer purpose, without placing the actual data portion in the erased state. Thus, even when an unexpected accident, such as power failure or shutdown, has occurred the instant the data transfer to the destination is completed, it is possible to reliably avoid a situation against the SCMS standard that the same actual data portion is left in both the destination storage medium and the source storage medium (hard disk 5).

Figure 6:
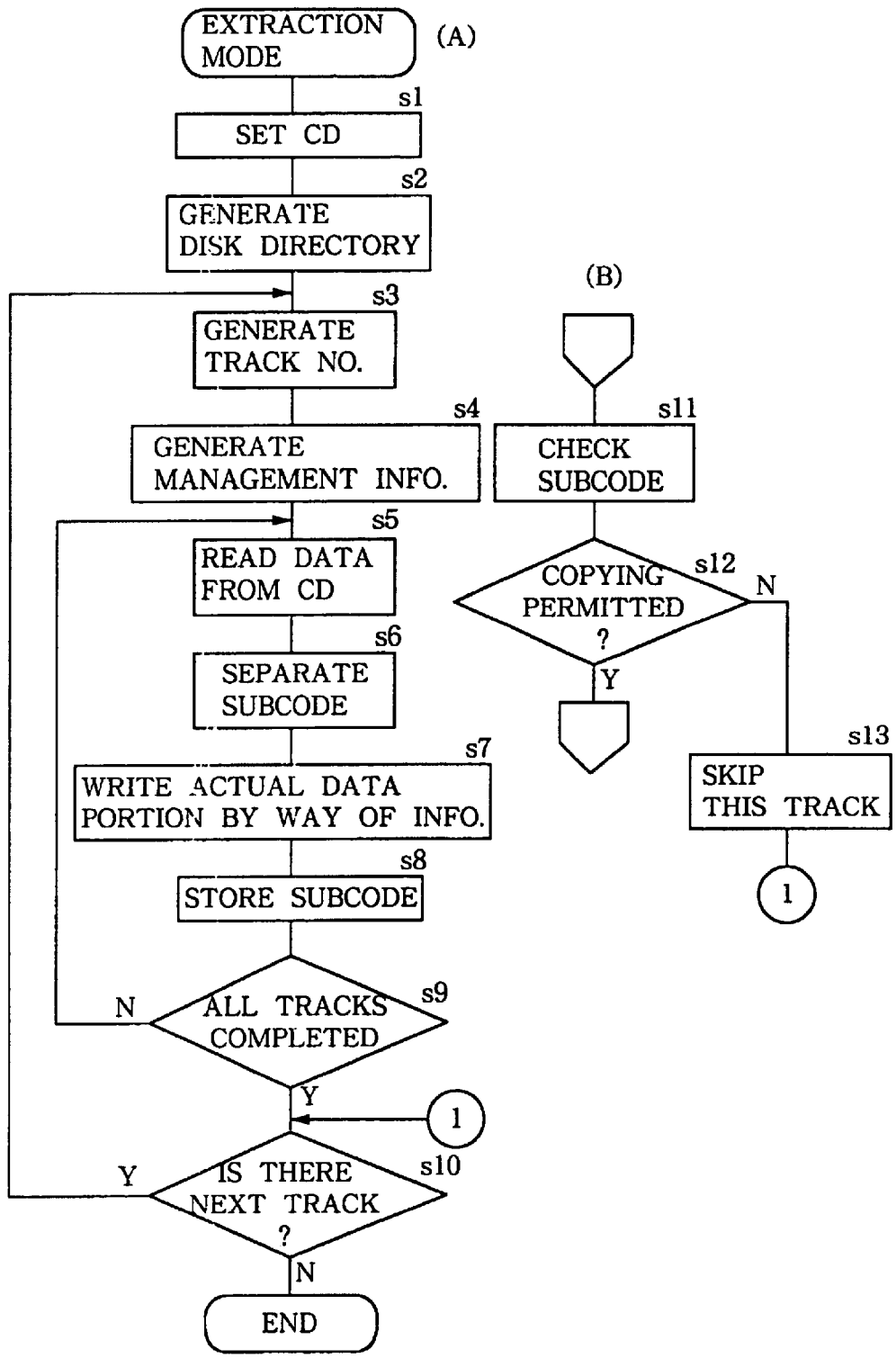
FIG. 6 is a flow chart showing an exemplary operational sequence of an extraction mode process performed in the digital-audio-signal recording apparatus.

FIGS. 6–10 are flow charts showing behavior of the digital-audio-signal recording apparatus in accordance with the embodiment of the present invention. Specifically, FIG. 6 is a flow chart showing an exemplary operational sequence of the extraction mode process for extracting audio data from an audio CD set in the CD drive 4 and storing the extracted audio data on the hard disk 5. More specifically, the flow chart of FIG. 6 shows behavior of the CPU 1 and controller 2. When an audio CD is set by the user in the CD drive 4 at step s1, a new disk directory for the thus-set audio CD is generated at step s2, and track numbers are sequentially generated, at step s3, starting with track number 1. Then, a management information record corresponding to the tracks is generated on the file management information table at step s4. These steps s1–s4 are carried out by the CPU 1. Then, data are read out from the audio CD at step s5, and the subcodes are separated from the read-out data and buffered at step s6. These steps s5 and s6 are carried out by the controller 2.

Once the leading audio data (frame data) of the track have been read out, a process shown in section (B) of FIG. 6 is carried out. Namely, the controller 2 checks the subcode information separated from the frame data at step s11 and determines whether copying of the data is permitted or not. If copying of the data is permitted as determined at step s12, the process of section (B) is continued, but if copying of the data is inhibited, further processing on the track is skipped at step s13, and control goes to step s10 as denoted at ①.

When the audio data extraction is to be executed, the main body of the audio data (actual data portion) is written to the hard disk 5 by way of the FIFO memory 3, at step s7. The audio data become an audio file of the track number generated at step s3 above. Then, necessary subcode information is stored in the file management information table at step s8. Then, the operations at and after step s5 are repeated until processing on this track is completed. When the processing on the track has been completed and if there is a next track to be processes on the audio CD, a track number representing the next track is generated under the disk directory at step s3, and the operations after step s3 are repeated for the next track. Once the above-described processing has been completed for all the tracks on the audio CD (step s9), the extraction mode process is brought to an end.

Figure 7:
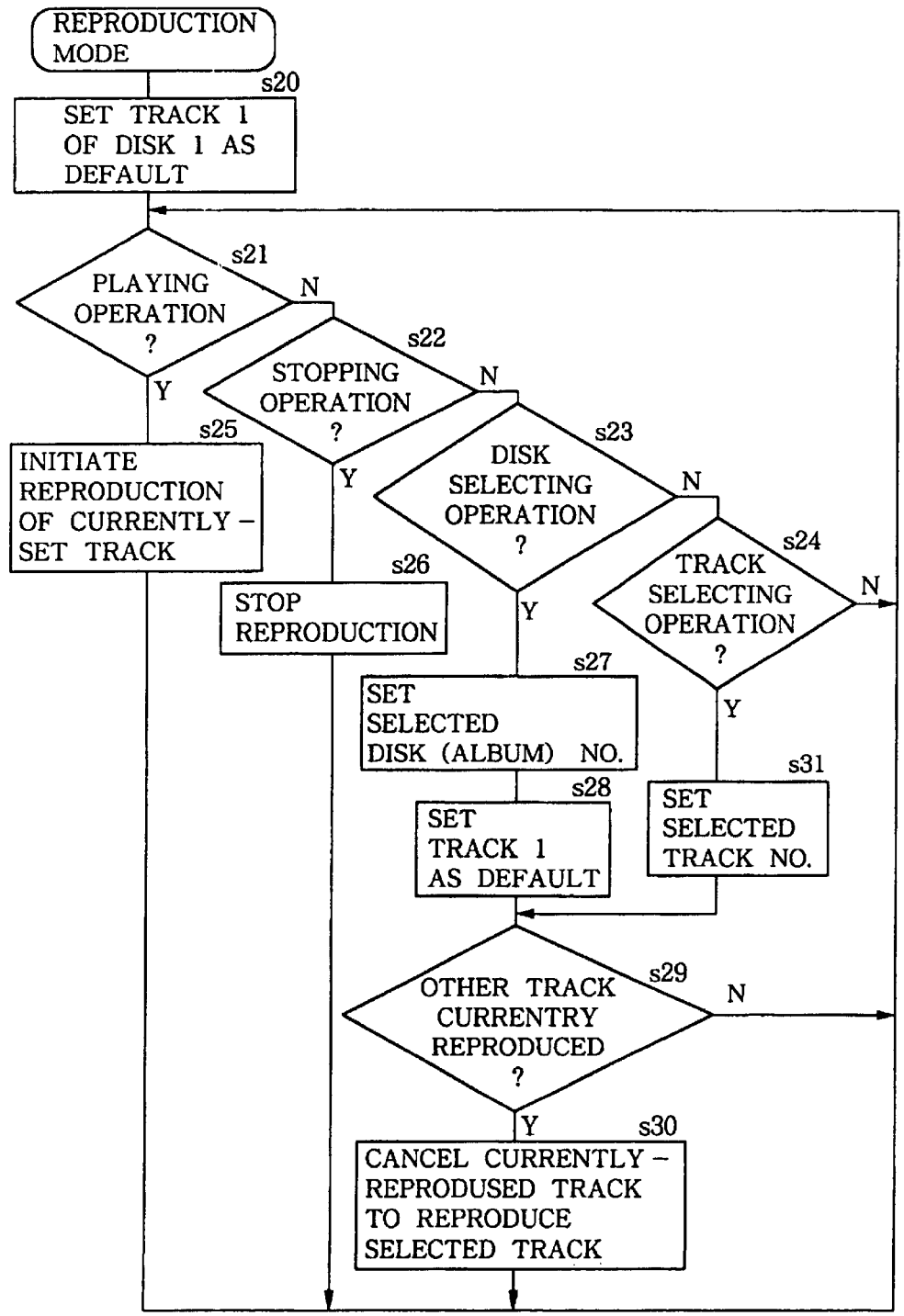
FIG. 7 is a flow chart showing an exemplary operational sequence of a reproduction mode process performed in the digital-audio-signal recording apparatus.

FIG. 7 is a flow chart showing an exemplary sequence of operations performed by the CPU 1 in the reproduction mode for reproducing audio data stored on the hard disk 5. Once the reproduction mode has been set, track 1 of disk 1 is first set as a default selected music piece at step s20. Then, the following operations are carried out in response to user's playing operation, stopping operation and track selecting operation of steps s21–s24.

Namely, when the playing operation is performed, such as by the user activating the play button, as determined at step s21, audio data reproduction of a currently-set track is initiated at step s25. When the stopping operation is performed, such as by the user activating the stop button, as determined at step s22, audio data reproduction being executed is terminated at step s26.

Further, when a particular disk or album is selected by manipulation, by the user, of the multi-functional jog dial as determined at step s23, the number of the selected disk or album is set as a selected disk at step s27, and track 1 of the disk or album is set as a default selected music piece at step s28. If any other track is being currently reproduced as determined at step s29, the currently-reproduced track is canceled so as to reproduce the selected track at step s30.

Further, when a particular track is selected by manipulation, by the user, of the multi-functional jog dial as determined at step s24, the number of the selected track is set as a default selected music piece at step s31. If any other track is being currently reproduced as determined at step s29, the currently-reproduced track is canceled so as to reproduce the selected track at step s30.

Figure 8:
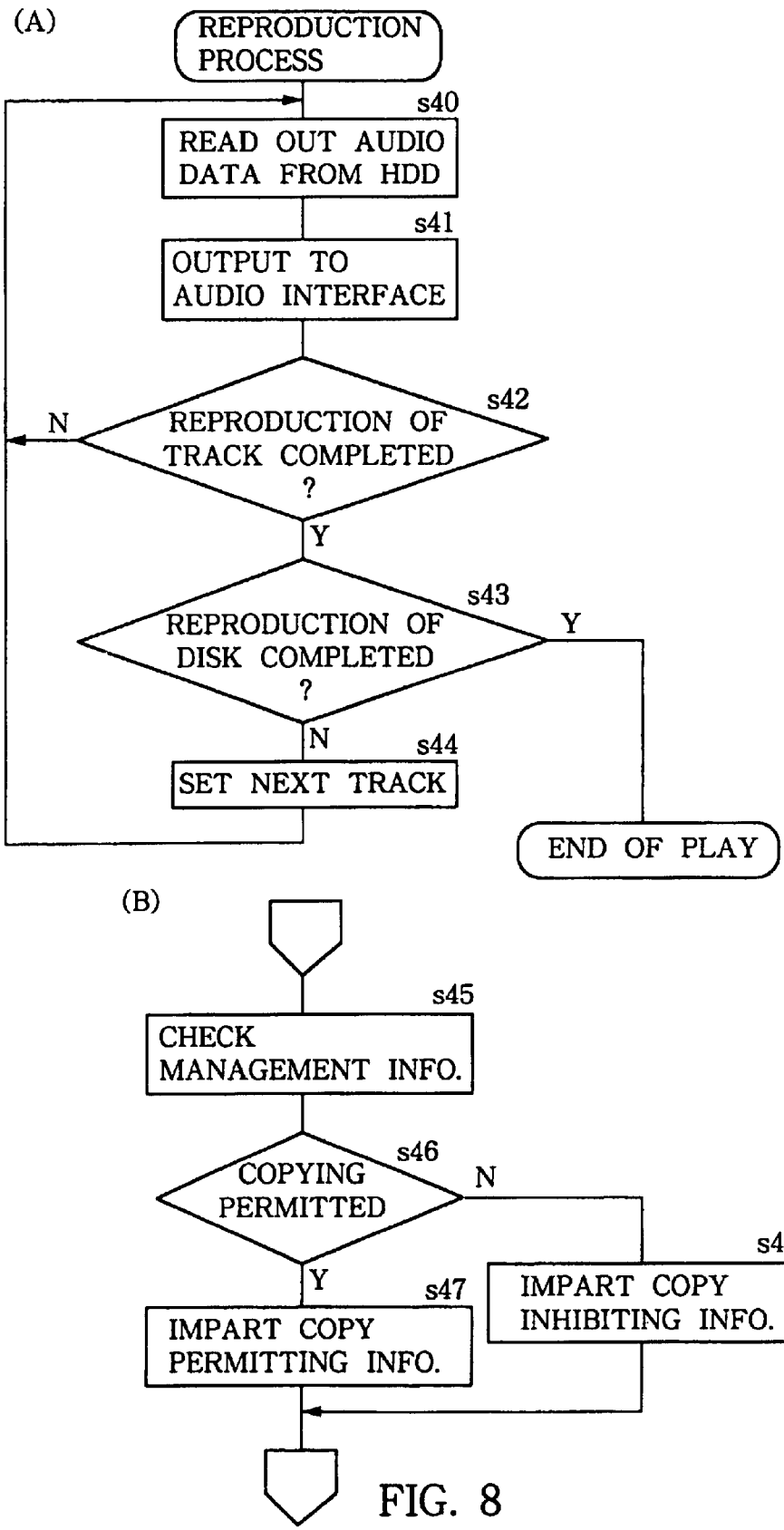
FIG. 8 is a flow chart showing an exemplary sequence of operations performed by a controller in the reproduction mode.

FIG. 8 is a flow chart showing an exemplary sequence of operations performed by the controller 2 in the reproduction mode. Once audio data reproduction is instructed by the CPU 1, the controller 2 reads out audio data of a designated track from the hard disk 5 at step s40 and outputs the read-out audio data to the audio interface at step s41. The data readout of this file is continued until the reproduction of the track is completed (step s42). Upon completion of the reproduction of the track, a next track to be processed is selected and the foregoing operations are repeated for the next track. The reproduction mode process is brought to an end when it is determined at step s43 that the reproduction has been completed for all the tracks of the selected disk or album.

Namely, the normal reproduction mode process is performed on a disk-by-disk or album-by-album basis and then brought to an end after the last music piece (track) of the selected disk or album has been reproduced. Other reproduction processes than the normal reproduction mode process are also possible, such as one for reproducing a plurality of disks or albums in succession and one for reproducing only one designated music piece.

In section (B) of FIG. 8, there is shown a flow chart of operations, performed at the start of data readout of a given track, for controlling outputs to the audio interface. First, the file management information corresponding to the given track is read out at step s45, and contents of the copying authorization/inhibition information are examined at step s46. If the copying authorization/inhibition information indicates that copying of the track is permitted or authorized, the audio data are output to the digital audio interface 22 with copying-permitted subcode information imparted to the audio data, and the audio data are also output to the analog audio interface 23 (step s47). If, on the other hand, the copying authorization/inhibition information indicates that copying of the track is inhibited, the audio data are output to the digital audio interface 22 with copying-inhibiting subcode information imparted to the audio data, and the audio data are also output to the analog audio interface 23 (step s48). Such arrangements can reliably prevent digital output of any track that should be absolutely inhibited from being copied.

Figure 9:
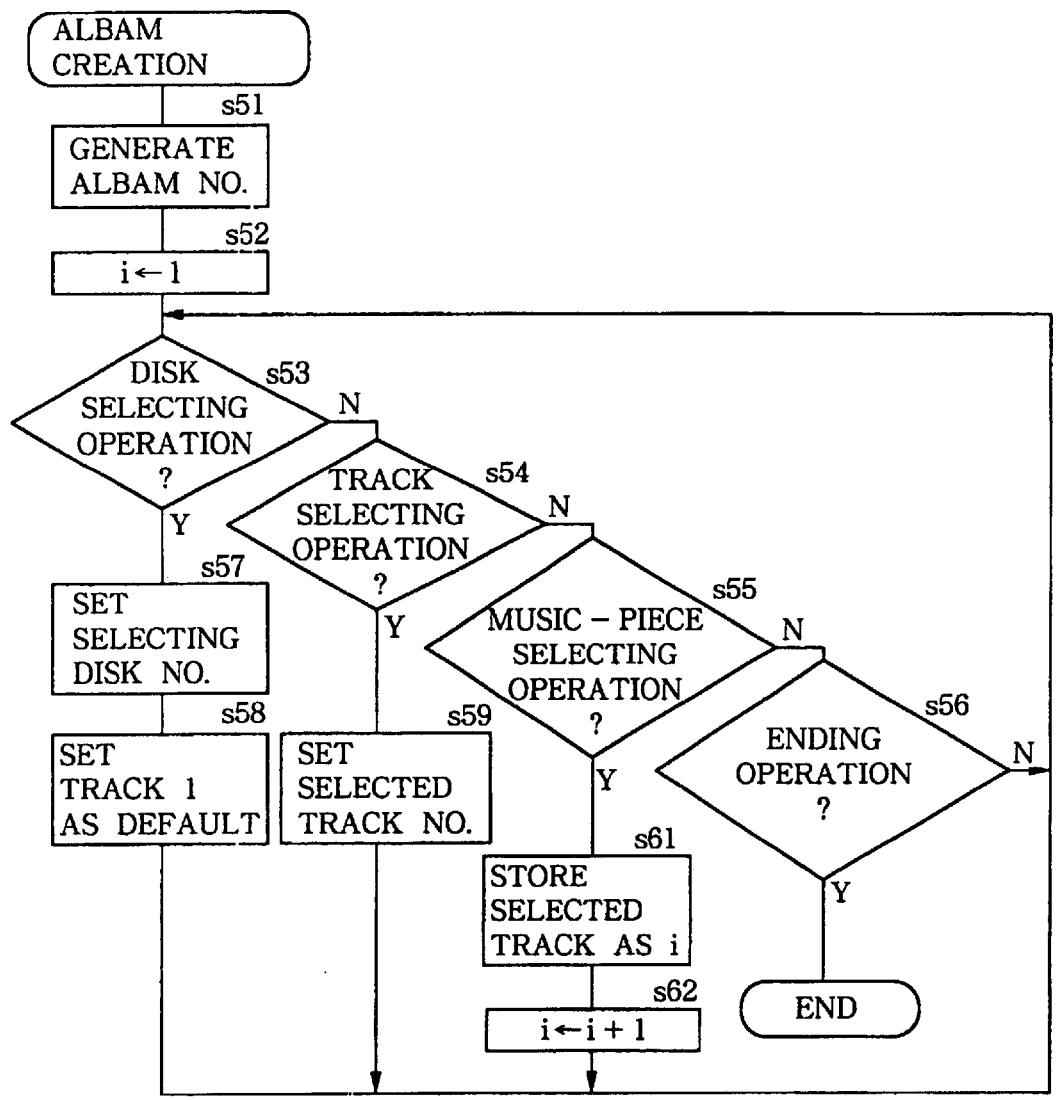
FIG. 9 is a flow chart showing an exemplary operational sequence of a process performed in the digital-audio-signal recording apparatus for creating an album.

FIG. 9 is a flow chart showing an exemplary operational sequence of a process for creating an album. As previously noted, the album is a listing of tracks that allows the user to reproduce a freely selected combination of various tracks as if the combination is stored on one disk. Namely, once an album creation mode is set, a unique number of the album to be currently created is generated at step s51; if the album is the first one to be created, album number 1 may be generated. Then, a value "1" is set as variable i indicative of a track number in the album, at step s52. After that, the following operations are carried out in response to user's disk selecting operation, track selecting operation, music-piece selecting operation and album-creation ending operation. Namely, when a particular disk or album is selected by manipulation, by the user, of the multi-functional jog dial as determined at step s53, a selected disk number is set at step s57, and track 1 of the disk is set as a default selected music piece at step s58. Further, when a particular track is selected by manipulation, by the user, of the multi-functional jog dial as determined at step s54, the selected particular track of the currently-selected disk is set as a selected music piece at step s59.

Then, once music-piece selecting operation is performed, such as by activating the music-piece selecting button, as determined at step s55, the track currently selected as the selected music piece is stored as the variable i at step s61 (see FIG. 4). After that, a value "1" is added to the variable i in preparation for selection of a next music piece, at step s62. Further, when album-creation ending operation is performed by the user, the album creation process is brought to an end.

Although the album creation process has been described as creating a new album, it is assumed here that contents of an already created album can also be modified by designation of the album number and track number.

Figure 10:
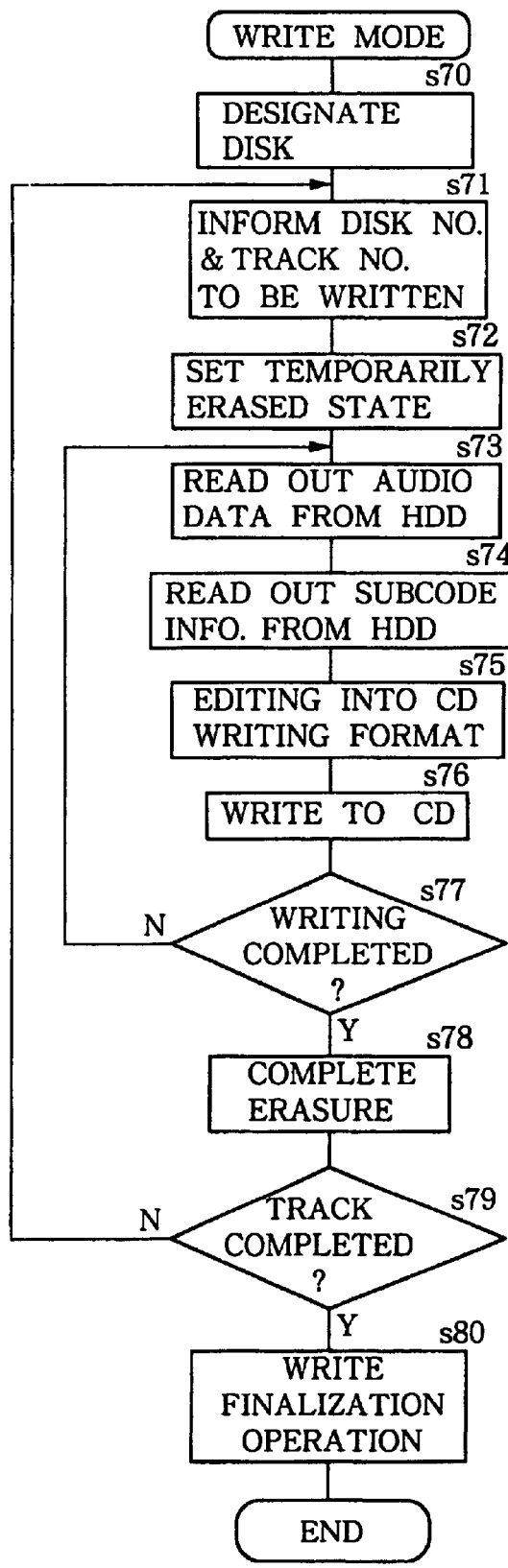
FIG. 10 is a flow chart showing an exemplary operational sequence of a write mode process performed in the digital-audio-signal recording apparatus.

FIG. 10 is a flow chart showing an exemplary operational sequence of the write mode process, which is a data transfer process for writing audio data of a disk or album to a CDR disk set in the CD drive 4 and, after the writing to the CDR disk, erasing the corresponding data stored on the hard disk 5.

In the write mode, the user first designates the number of the disk or album to be written onto the CDR disk, at step s70. Then, the leading track number of the disk or album is informed to the controller 2 at step s71, and the erasure state flag in the file management information table corresponding to the leading track is set to indicate an erased state at step s72. After that, the audio data and subcode information are read out from the hard disk 5 at steps s73 and s74. The thus read-out audio data and subcode information are edited or modulated into the CD writing format at step s75, and then written onto the CDR disk at step s76. Note that the operations s73 and s74 are carried out by the controller 2 and the operations s75 and s76 are carried out by cooperation between the controller 2 and the CD drive 4. When the writing is completed for the track as determined at step s77, the file validity information, contained in the file management information corresponding to the track on the hard disk 5, is set to indicate "non-valid" meaning that the data of the track on the hard disk 5 have been completely erased. Such arrangements can prevent further (second-generation) copying (i.e., re-copying) of the audio data copied from the CD to the hard disk 5, to thereby eliminate a possibility of unfair copying against the SCMS standard.

The foregoing operations are carried out in the increasing order of track numbers on the selected disk or album. Once the write operations have been completed for all the tracks on the selected disk or album as determined at step s79, a predetermined finalizing operation is performed at step s80 for allowing the thus-written blank CD to be properly reproduced as an audio CD.

Whereas the write mode process of FIG. 10 has been described as writing audio data to a CDR disk set in the CD drive 4, the audio data may be output via the digital audio interface 22.

In summary, the digital-audio-signal recording apparatus of the present invention is characterized by examining the copying authorization/inhibition information of digital audio data read out from a disk-shaped storage medium, and determining, on the basis of the examined contents of the authorization/inhibition information, whether or not to write the audio data to a storage section. Such arrangements can effectively inhibit chain-like digital copying, and thus allow a recording apparatus, such a hard disk recorder, to be properly used as consumer equipment.

When digital audio data stored on the hard disk have been written to the disk-shaped storage medium, which is another storage means in the digital-audio-signal recording apparatus, the recording apparatus erases the digital audio data from the hard disk in correspondence with the audio data writing to the disk-shaped storage medium. Such arrangements too can effectively inhibit chain-like digital copying, and thus allow a recording apparatus, such a hard disk recorder, to be properly used as consumer equipment.

Even where the hard disk has the digital audio data and subcode information separately stored thereon, the present invention permits copying or creation of an audio CD containing textual information and the like.

Further, with the arrangement that the operation for writing, on the hard disk, digital audio data read out from a medium reading section, such as the CD drive and the operation for checking the subcode information are performed primarily via the bus interface without intervention of the CPU, the present invention can significantly lessen the loads on the CPU. Thus, even where an inexpensive low-speed CPU is used, the present invention permits efficient high-speed copying. As a consequence, the present invention can provide inexpensive consumer-oriented recording equipment. Further, with the hard disk capable of storing tracks (music pieces) corresponding to a plurality of audio CDs, the present invention allows any desired ones of the tracks to be freely combined and reproduced. As a result, the digital-audio-signal recording apparatus of the present invention can operate as an extremely-high-speed CD changer which requires little time for CD replacement.

What is claimed is:

1. A digital-audio-signal recording apparatus comprising:
a disk drive that reads out data stored on a disk-shaped storage medium;
a hard disk drive that stores digital audio data, read out from the disk-shaped storage medium, on a hard disk; and
an interface control section that writes, on the hard disk, the digital audio data read out from the disk-shaped storage medium only when copying authorization/inhibition information read out from the disk-shaped storage medium indicates that copying of the digital audio data is permitted.

2. A digital-audio-signal recording apparatus as claimed in claim 1 wherein said interface control section includes a bus interface, and an operation for writing, on the hard disk, the digital audio data read out from the disk-shaped storage medium and an operation for extracting the copying authorization/inhibition information are performed via said bus interface.

3. A digital-audio-signal recording apparatus as claimed in claim 1 wherein said hard disk drive stores audio data of tracks corresponding to a plurality of the disk-shaped storage media, and said interface control section reproductively outputs the digital audio data of the tracks from the hard disk, and which further includes a music-piece-selection control section that selects a desired track from among the tracks corresponding to the plurality of the disk-shaped storage media and designates the selected desired track as a track to be reproduced via said interface control section.

4. A digital-audio-signal recording apparatus as claimed in claim 3 wherein said music-piece-selection control section includes a section that stores, as an album, a listing of tracks selected from among the tracks corresponding to the plurality of the disk-shaped storage media.

5. A digital-audio-signal recording apparatus comprising:
a hard disk drive that has a hard disk storing digital audio data;
a write section that writes digital audio data on a disk-shaped storage medium; and
an interface control section that causes said write section to write the digital audio data, stored on the hard disk, to the disk-shaped storage medium and also erases said digital audio data stored on the hard disk in correspondence with writing of the digital audio data to the disk-shaped storage medium.

6. A digital-audio-signal recording apparatus comprising:
a hard disk drive that has a hard disk storing digital audio data and subcode information;
a write section that writes data on a disk-shaped storage medium; and
an interface control section that reads out the digital audio data and subcode information from the hard disk and edits the read-out digital audio data and subcode information into a CD-DA format, so as to supply the edited digital audio data and subcode information to said write section.

* * * * *